May 5, 1959  L. W. SCHMIDT  2,884,975
BEET IMPELLING AND DEFLECTING UNIT
Filed June 23, 1958

INVENTOR.
Lewis W. Schmidt
BY
ATTYS

United States Patent Office 2,884,975
Patented May 5, 1959

---

2,884,975

BEET IMPELLING AND DEFLECTING UNIT

Lewis Wallace Schmidt, Rio Vista, Calif., assignor of small interests to numerous assignees Application June 23, 1958, Serial No. 743,871

8 Claims. (Cl. 146—85)

This invention relates in general to a beet harvester of the type which includes a spiked, beet pick-up wheel, a generally horizontal rotary disc above and cooperating with the wheel to top the beets, the topped beets being received on such disc, a topped beet carry-off conveyor which one side of the disc overhangs, and a driven feed auger disposed above the disc in a position to shift or convey the topped beets across said disc and to discharge them from one side thereof onto the carry-off conveyor.

In particular, the present invention is a modification of the structure shown in United States Patent No. 2,770,273, dated November 13, 1956, on "Beet Impelling Device."

One important object of this invention is to provide an improved beet impelling and deflecting unit which is operative to subject the beets to a cleaning or soil removing action after topping and before such beets deliver on the rotary topping disc to the feed auger; such cleaning of the topped beets preventing sluggish movement thereof, and which previously occurred at this point if the beets were caked with sticky soil, and which tended to cause the beets to pile up and interfere with their free flow.

Another important object of the invention is to provide a beet deflecting and impelling unit which includes a novel and improved, beet deflecting member on the driven feed auger at its outer or discharge end; such member being operative to cause the topped and cleaned beets—as shifted across the rotary topping disc by said auger—to be effectively and positively deflected and discharged from said disc and onto the carry-off conveyor; i.e., without any tendency of such beets to stick or pile up on the disc adjacent the discharge point.

A further object of the invention is to provide a beet impelling and deflecting unit which is operative to accomplish a continuous and smooth flow of the beets from the time that they are topped until they are finally discharged onto the carry-off conveyor.

A still further object of the invention is to provide a beet impelling and deflecting unit which is designed for ease and economy of manufacture, ready installation on a beet harvester, and long service with a minimum of maintenance or repair being required.

It is also an object of the invention to provide a practical, reliable and durable beet impelling and deflecting unit, and one which will be exceedingly effective for the purpose for which it is designed.

These objects are accomplished by means of such structure and relative arrangement of parts as will fully appear by a perusal of the following specification and claims.

Figure 1:
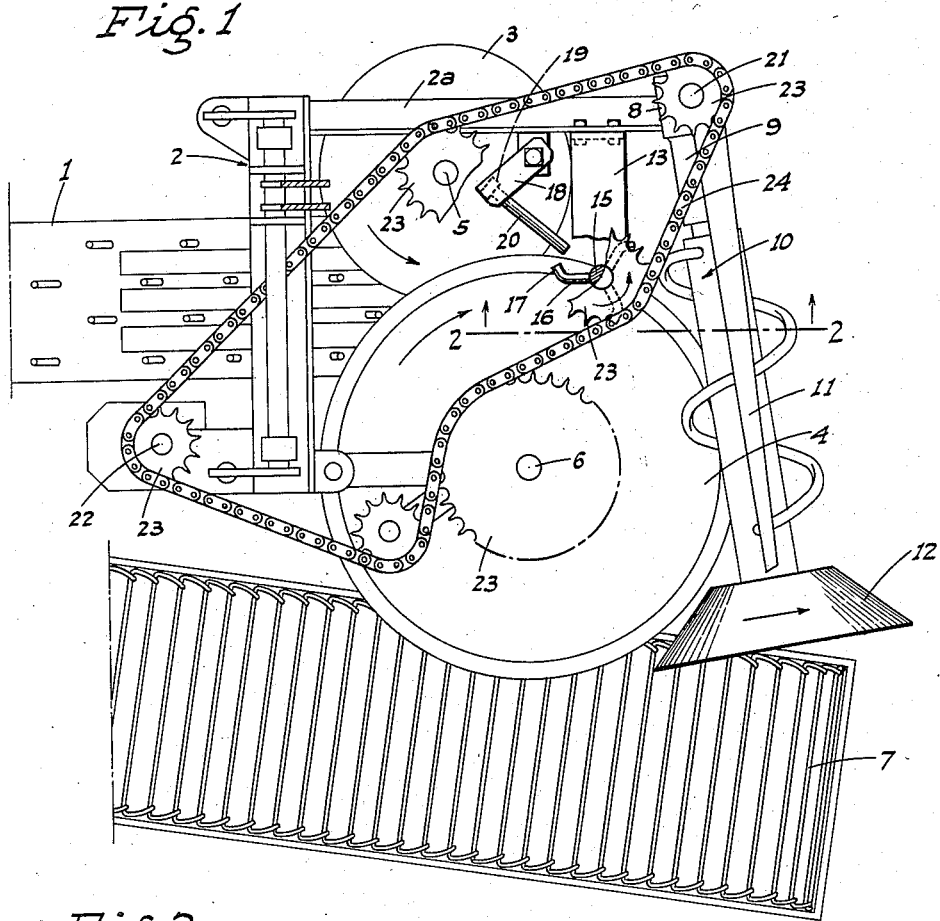
Fig. 1 is a fragmentary top plan view of a beet harvester topping unit embodying the present invention.

Referring now more particularly to the drawings and to the characters of reference thereon, the harvester, in which the present invention is embodied, includes a spiked, beet pick-up wheel 1 functioning upon rotation and advance of the harvester to impale beets in the ground and to then carry them to the top of the wheel, at which point the beets stand in an inverted position. A rigid frame, indicated generally at 2, overlies the wheel 1, and mounted on said frame is the beet topping unit which includes driven, cooperating cutting discs 3 and 4 arranged in overlapping relation in a generally horizontal plane; disc 4 being the topmost and larger disc of the two.

The discs 3 and 4 are fixed on vertical shafts 5 and 6, respectively, suitably journaled in frame 2; such discs being positioned relative to wheel 1 so as to top the upstanding inverted beets as raised by said wheel, and the topped beets then pass onto and are supported by said discs.

A longitudinal and rearwardly extending conveyor 7 is mounted on the harvester so as to be overlapped adjacent but short of its forward intake end by the disc 4 on the side thereof opposite disc 3.

The frame 2 includes a longitudinal beam 2a and an upstanding post 8 at its forward end and at the same side as disc 3. Adjacent its lower end the post is provided with a laterally projecting boss 9 which supports a driven beet engaging and feed auger 10. The auger 10 is disposed horizontally in close overlying relation to disc 4 and at an acute angle to conveyor 7; the outer end portion of said auger projecting a short distance beyond the periphery of disc 4 in the direction of said conveyor. A deflector plate 11, supported by post 8, extends along and upstands from the auger to prevent beets from overriding the latter.

Mounted on and rigid with the outer end of the auger is a frusto-conical deflector 12, of greater diameter than the auger, disposed with its small end innermost. The rear peripheral face of the deflector overlaps the conveyor slightly, and is generally tangent to the adjacent forward edge portion of the disc 4, as shown in Fig. 1. The auger 10 and the deflector 12 are rotated so that said deflector turns in the direction indicated by the arrow; the auger being wound relative to its direction of rotation so as to feed beets toward the deflector. With this arrangement therefore it will be seen that beets fed laterally on disc 4 toward the conveyor 7 by the auger 10 will be engaged and smoothly deflected from such disc onto the conveyor by said deflector 12.

In order to both clean the beets after they are topped, and to feed them to the auger 10 at its inner end, the following arrangement is provided:

Projecting laterally from beam 2a in generally the same direction as the auger, and between the post 8 and the disc 3, is a bracket 13 which supports the bearing sleeve 14 of a depending shaft 15. This shaft overhangs and terminates short of the disc 4, being located in a transverse plane adjacent the plane of intersection of the forward edges of the topping discs, and also relatively close to the transverse plane of the inner end of auger 10.

Vertically spaced rows of circumferentially spaced fingers 16 project radially from shaft 15; the outer end of each finger being formed as a tip 17 bent away, in a horizontal plane, from the direction of rotation of the shaft 15 (see Fig. 1).

Figure 2:
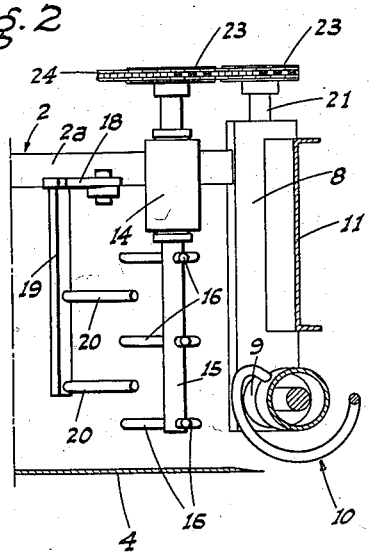
Fig. 2 is a fragmentary vertical section taken on line 2—2 of Fig. 1.

Another bracket arm 18 is supported from beam 2a rearwardly of bracket 13, and a rigid standard 19 depends from arm 18. Rigid horizontal fingers 20 project forwardly from the standard 19 at levels between those of fingers 16, as shown in Fig. 2. The fingers 20 are disposed substantially radially relative to shaft 15 and extend at an acute angle to the longitudinal plane of wheel 1 and the machine as a whole, so as to diagonal from standard 19 in the general direction of the outer end of the auger 10. With this arrangement the beets as topped and moving forwardly on one disc or the other are immediately engaged either by the deflecting fingers 20—which direct them toward the rotary finger unit—or by the fingers 16 of said unit without first contacting said deflecting fingers. In either case, the rapidly rotating fingers 16 knock any dirt from the beets and throw the latter against the auger 10 for movement thereby on disc 4 to the outer end deflector 12, whence the beets are discharged onto the conveyor 7, as previously described.

To drive the various shafts, including the shaft 21 which actuates the auger through suitable gearing (not shown), from the initial drive or power shaft 22, all said shafts are provided—on their upper ends—with sprockets 23, all on a common level, and about which an endless chain passes; said chain being engaged with the various sprockets in such a manner that the driven shafts and elements attached thereto are rotated in the proper direction.

From the foregoing description it will be readily seen that there has been produced such a device as will substantially fulfill the objects of the invention, as set forth herein.

While this specification sets forth in detail the present and preferred contruction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a beet harvester which includes a generally horizontal topping disc, a conveyor extending lengthwise of the harvester in a rearward direction and at its forward portion being overlapped by one side of the disc, and a transverse rotary beet feeding auger overlying the forward part of the disc and arranged to engage and feed disc-supported beets from the opposite side of said disc to said one side thereof; a rotary member fixed on the auger at the end thereof adjacent the conveyor operative to guide and deflect such auger fed beets from said one side of the disc onto the conveyor, and said rotary member having a continuous beet engaging face.

2. A structure, as in claim 1, in which the rotary member is frusto-conical in form and concentric with the auger; the small end of said frusto-conical member being adjacent said auger.

3. A structure, as in claim 2, in which said auger is disposed at an acute angle to the conveyor in a direction rearwardly of the latter; the large end of the frusto-conical member partly overlying the conveyor with the rear face of said member lying in a vertical plane close to the adjacent peripheral portion of the disc and substantially tangent thereto; the under part of the member turning toward the disc.

4. In a beet harvester which includes a conveyor for topped beets, a pair of transversely disposed cooperating beet topping and supporting discs disposed in overlapping relation above the level of an adjacent portion of the conveyor, and a driven feed auger above the discs adjacent the forward part thereof, the auger extending transversely of the harvester from an initial end adjacent one disc and being positioned to feed disc-supported beets laterally away from said end and to discharge such beets onto the conveyor; an upstanding rotary unit mounted back of but adjacent said initial end of the auger, said unit including means to engage disc-supported beets and to both knock any dirt adhering to the beets from the same and to impel such beets into engagement with the auger adjacent said initial end thereof.

5. A structure, as in claim 4, in which said rotary unit includes an upstanding driven shaft, and vertically spaced rows of circumferentially spaced fingers projecting from the shaft.

6. In a beet harvester which includes a conveyor for topped beets, a pair of transversely disposed cooperating beet topping and supporting discs disposed in overlapping relation above the level of an adjacent portion of the conveyor, and a driven feed auger above the discs adjacent the forward part thereof, the auger extending transversely of the harvester from an initial end adjacent one disc and being positioned to feed disc-supported beets laterally away from said end and to discharge such beets onto the conveyor; an upstanding rotary unit mounted back of but adjacent said initial end of the auger, said unit including means to engage disc-supported beets and to both knock any dirt adhering to the beets from the same and to impel such beets into engagement with the auger adjacent said initial end thereof, and a stationary unit mounted back of the rotary unit in position and arranged to engage disc supported beets as initially topped and to deflect the same laterally toward the rotary unit.

7. A structure, as in claim 6, in which said stationary unit comprises a fixed standard disposed back of the rotary unit and laterally offset therefrom in a direction away from the outer end of the auger, and fingers rigid with and projecting from the standard in a direction generally toward the axis of the rotary unit.

8. In a beet harvester which includes a conveyor for topped beets, a pair of transversely disposed cooperating beet topping and supporting discs disposed in overlapping relation above the level of an adjacent portion of the conveyor, and a driven feed auger above the discs adjacent the forward part thereof, the auger extending transversely of the harvester from an initial end adjacent one disc and being positioned to feed disc-supported beets laterally away from said end and to discharge such beets onto the conveyor; an upstanding driven shaft mounted back of but adjacent said initial end of the auger, vertically spaced rows of circumferentially spaced fingers projecting radially from the shaft, a fixed standard disposed back of the shaft and fingers and laterally offset therefrom in a direction away from the outer end of the auger, and fingers rigid with and projecting from the standard in a direction generally toward the axis of the shaft and disposed at levels intermediate the rows of shaft mounted fingers.

No references cited.